United States Patent Office 3,708,414
Patented Jan. 2, 1973

3,708,414
METHOD OF AND MEANS FOR REMOVING EXHAUST GASES FROM AN OPEN FURNACE VESSEL
Max Laube, Zurich-Hongg, Switzerland, assignor to Swiss Aluminium Ltd., Neuhausen am Rheinfall, Switzerland
Filed July 24, 1969, Ser. No. 844,480
Claims priority, application Switzerland, July 30, 1968, 11,439/68
Int. Cl. C22d 3/02; F24f 9/00
U.S. Cl. 204—247
6 Claims

ABSTRACT OF THE DISCLOSURE

For the removal of exhaust gases from an electrolytic melt vessel open on top, an air curtain is set up surrounding the top of the vessel and directed towards a source of suction.

---

The invention relates to the removal of exhaust gases from open electrolytic furnaces, and is particularly concerned with the problems that arise during the production of aluminum from electrolytic melts. In the industrial production of aluminum it is important to maintain a clean working atmosphere in the furnace houses, and for this purpose expensive apparatus are necessary, as the gases must be collected and cleaned before they can be discharged into the atmosphere.

Various systems are in use at present. In one system, used in furnace houses in which the furnaces are in the open so that the exhaust gases escape into the house, the whole atmosphere in the furnace house is subjected to suction and drawn away through the roof. This requires powerful and expensive fans, as well as numerous gas purifiers extending over the whole length of the house and generally mounted in the roof. With such a system about 2,000 Nm.$^3$ gas must be drawn off for each kilogram of aluminum produced.

In another system the individual furnaces are wholly enclosed and the exhaust gases are removed directly from each furnace. In this case the amount of air to be removed is only about 10% of that when the whole atmosphere in the house is subjected to suction, so less powerful fans are required, and this constitutes a substantial advantage. In addition, the gases can be led through a suction duct to a central purifying system, so that there is no need for the numerous purifiers in the roof extending over the whole length of the house. This second system, on the other hand, with its encased furnaces presents the considerable disadvantage that the servicing of the furnaces, that is to say the discharge of metal, the supply of alumina and so forth is complicated and thus the process is rendered more expensive. In fact, the complete removal of the exhaust gas is partially illusory, as the casings must be removed in order to service the furnaces. Not only does this involve additional work, but while the casing is removed the exhaust gases escape into the furnace house so that the atmosphere in it is no longer maintained completely pure.

A further system involves the application of suction hoods over the furnaces. In this construction also a large part of the exhaust gases escapes into the surrounding atmosphere, particularly during the servicing of a furnace. The gas-air mixture to be removed is larger in volume than in the system last described.

It is accordingly among the principal objects of the invention to avoid the disadvantages of these various systems.

Further objects and advantages of the invention will be set forth in part in the following specification and in part will be obvious therefrom without being specifically referred to, the same being realized and attained as pointed out in the claims hereof.

According to the general principles of the instant invention, an air curtain directed towards a source of suction is set up around the furnace to prevent the escape of the exhaust gases into the atmosphere inside the furnace house.

In principle this curtain can flow either upwards or downwards. The exhaust gases are subjected to an upward force which results from their high temperature and which may be called their thermal buoyancy, and it is advantageous to direct the air curtain upwards around the exhaust gases so that these are wholly entrained. A suction inlet for the resultant gas stream can advantageously then be arranged directly above the furnace. The inlet may however be that of a suction plant mounted in the roof. In this case the total volume of gas to be drawn away is greater than if the suction inlet is immediately above the furnace.

If the air curtain is directed downwards, only a part of the rising exhaust gases are entrained by it and the suction system must then be divided into two parts, a lower part for the removal of the curtain with some entrained gases, and an upper part above the furnace for the removal of the main body of the rising exhaust gas.

The invention will now be described in greater detail with reference to the accompanying diagrammatic drawings, in which.

Figure 1:
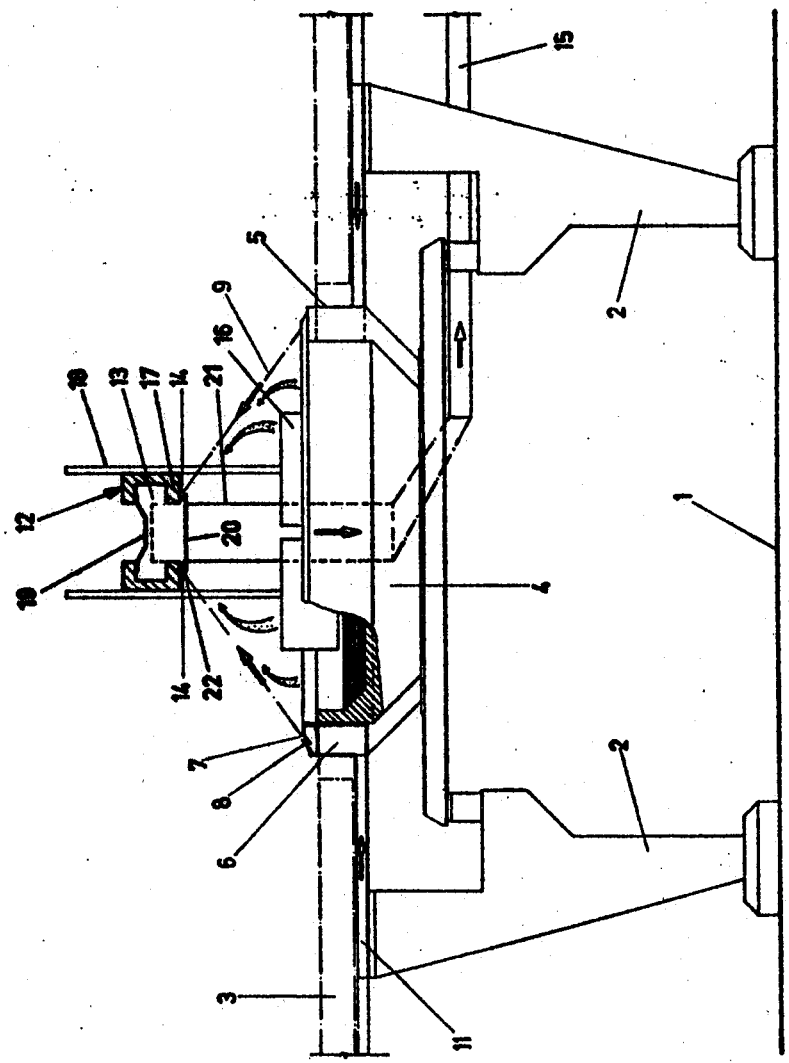
FIG. 1 is an end elevational view, partly in section, of an aluminum electrolytic furnace.
Figure 2:
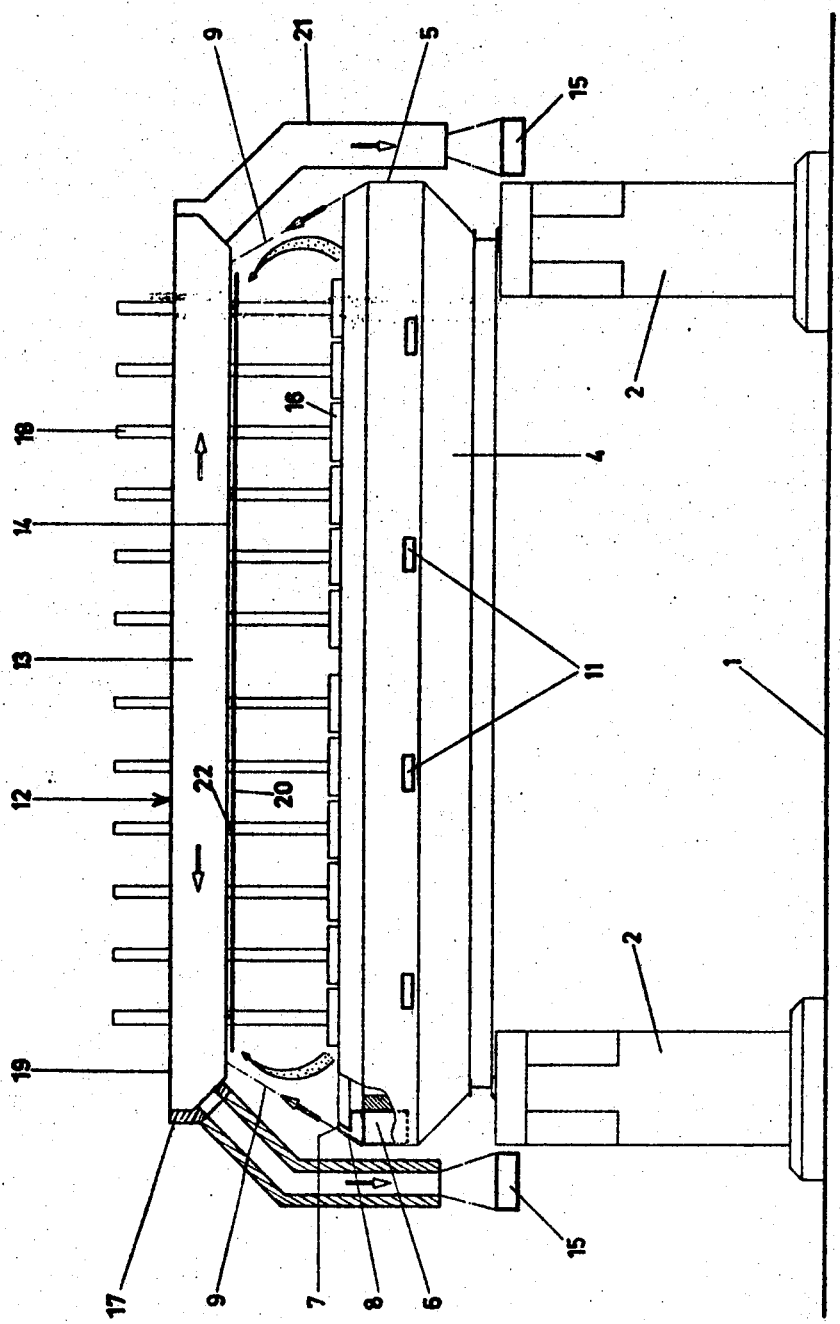
FIG. 2 is a side elevational view, also partly in section, of the same furnace.
Figure 3:
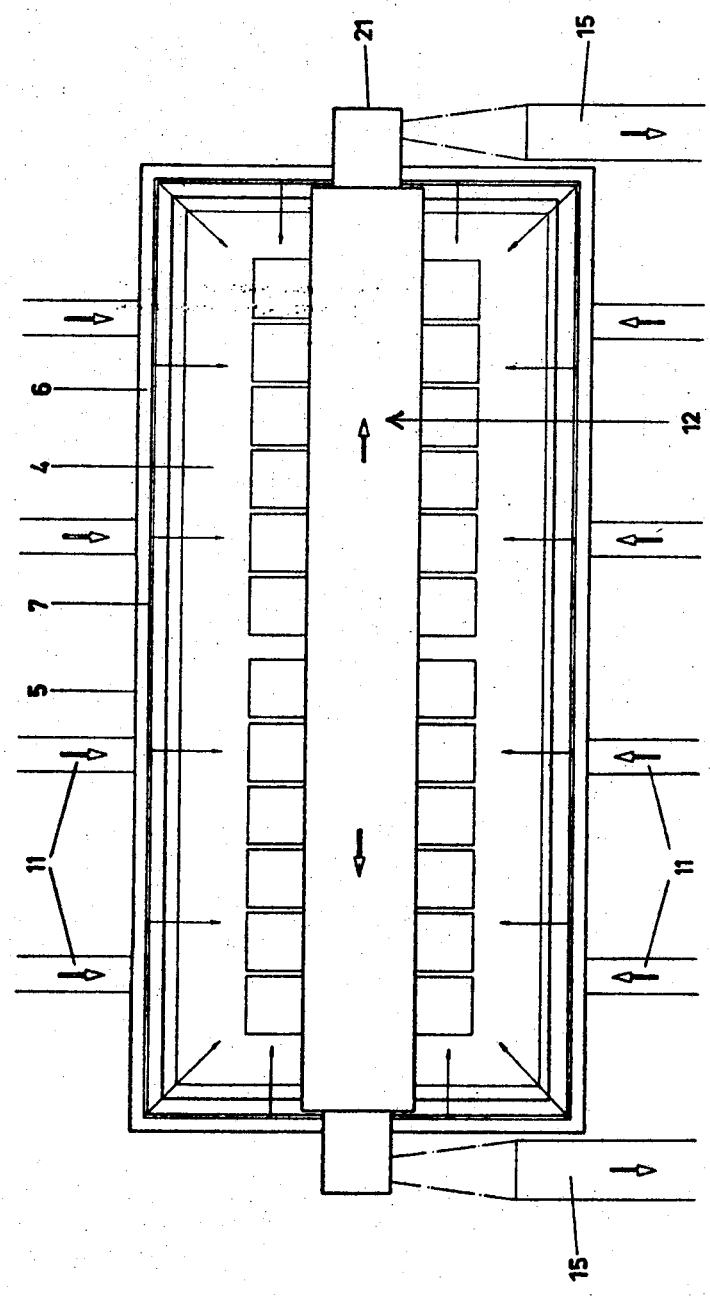
FIG. 3 is a plan view thereof.
Figure 4:
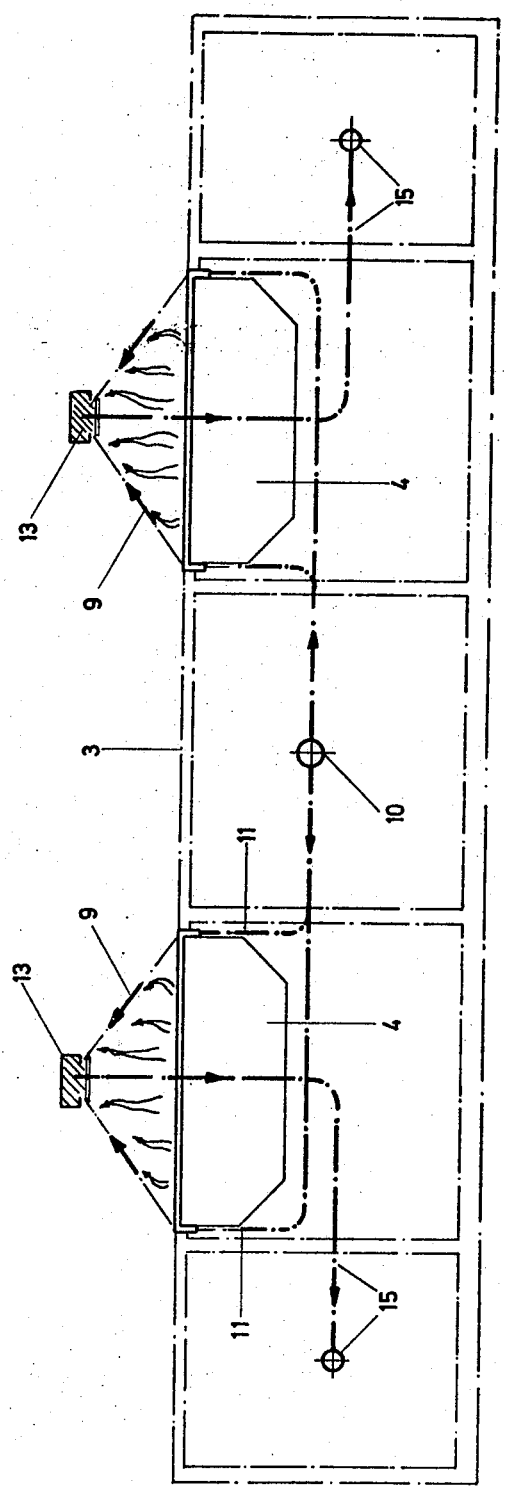
FIG. 4 is a schematic sectional view through the floor of a furnace house showing two electrolytic furnaces and the paths of the air and the exhaust gases in the neighborhood of the furnaces.

In the furnace house shown, the floor 3 of the house proper is carried by supports 2 above the ground 1, and a vessel such as the cathode pot 4 of the furnace is let into the floor 3 and is also carried by the supports 2. A duct 6 is formed inside the wall 5 of the pot 4 around the entire circumference and is formed with an outlet opening 7 between inclined walls 8 so that air flowing under pressure through the duct 6 leaves as an upwardly inclined curtain 9.

The air under pressure is supplied through a central distributing pipe 10 from which all the furnaces in a house or in a part of it are fed through pipes 11 leading to the separate furnaces, there being one or more pipes for each furnace in accordance with the size of the furnaces. The distributing pipe 10 is shown as arranged in the floor 3, but of course it can be otherwise arranged.

The four parts of the air curtain produced at the four sides of the cathode pot 4 converge to meet above the center line of the furnace, entraining the exhaust gases as shown by arrows in FIG. 1, and thus preventing them from escaping into the surrounding atmosphere.

In the furnace shown, anodes 16 are arranged in two rows and are carried by a supporting structure 12, which includes horizontal members 17 and anode rods 18. The furnace works with pre-burnt anodes. The members 17 are bus bars that carry the current to the anode rods 18; and are spanned by a cover 19 over their whole length, and thus form a gas discharge conduit 13, which may form a part of the complete supporting structure 12.

Below the members 17, and supported from them by bolts 22, there is provided a plate 20 which extends over the entire length of the furnace so as to leave slits along each side through which the gases can pass into the gas conduit 13. The conduit 13 is connected at each end to downcomers 21 which lead to ducts 15. The whole system of discharge conduit 13 downcomers and ducts is subjected to suction, and the gases passing through it are led to a purifier, and when purified discharged into the atmosphere.

The suction can be set up by fans provided either individually for each furnace or centrally for a group of furnaces. In such suction apparatus having slit inlets the suction requirements are, as is well known, greater as the distance between the fan and the inlet increases. Accordingly in order to produce a uniform intake over the whole length of the gas conduit 13, the slits 14 are advantageously made wider as the distance from the fan increases.

It is important that the velocity of the air in the curtain should be uniform throughout the whole length of the curtain, so the cross-section of the duct 6 must be such that it can form a pressure chamber all around the vessel 4.

The provision of the duct 6 in the wall of the vessel 4 is suitable in the construction of a new furnace, but in the application of the invention to existing furnaces an air pipe may instead be provided around the pot. Whether the air emerges from the duct or pipe through slits or nozzles, it is important to ensure that these are so constructed as to produce an air curtain directed properly to the gas conduit 13. The size and specific construction of a furnace, and the volume of the exhaust gases are factors to be taken into account in determining the width of the slits or the size of the nozzles, as well as the angle at which the gas curtain is formed. Another factor to be taken into account is that the air emerging from the duct 6 or any surrounding pipe does not have the same temperature as the furnace gases, and accordingly the thermal buoyancy resulting from this temperature difference must be taken into account. The most suitable angle can very easily be determined, for example, by simple tests.

The capacity of suction should be greater than the output of air for forming the curtain so as to ensure that there is always a slight negative pressure on the atmosphere around the curtain, particularly around the upper portion of the curtain.

It is found that air amounting to about 100 Nm.$^3$ per kilogram of aluminum produced is enough for the curtain, but in the conduit 13 the gas-air mixture amounts to about 200 Nm.$^3$ per kilogram of aluminum.

The invention can be applied to any of the kinds of aluminum electrolytic furnaces usual at the present time. The furnace shown in the drawing works with pre-burnt anodes. With furnaces with Söderberg anodes the gas discharge conduit 13 can be arranged on the anode casing around the anode block.

Certain of the advantages of the invention have already been herein referred to. It may be useful, however, to allude particularly at this point to the following:

Since by means of the invention the exhaust gases are removed as a comparatively concentrated gas mixture, the whole gas conveying and purifying plant can be smaller, thus reducing the capital cost of the installation. A further advantage is that there is no hindrance to the servicing of the furnace, and vice versa the furnace servicing does not have any adverse effect on the removal of the exhaust gases.

I wish it to be understood that I do not desire to be limited to the exact details of construction shown and described, for obvious modifications will occur to a person skilled in the art.

I claim:
1. In a method of removing exhaust gases from a vessel forming a part of an open electrolytic aluminum melting furnace and having a top uncovered throughout at least a portion,
   the steps comprising,
   providing a continuous air curtain to envelop the entire circumference at least of the uncovered portion of the vessel top,
   and directing said air curtain towards a source of suction thereby preventing the escape of exhaust gases into the atmosphere surrounding said furnace.

2. A method, as claimed in claim 1, in which the air curtain is converged upwardly around the exhaust gases arising from said vessel and said source of suction is located substantially at the apex of said converging curtain.

3. In a method, as claimed in claim 1, in which the suction exerted by said source is so correlated with the pressure of the air forming the curtain, that there is always negative pressure in the atmosphere around the curtain.

4. In a method of removing exhaust gases from a vessel, said vessel forming a part of an open electrolytic aluminum melting furnace including anodes and at least one bus bar arranged above said vessel for supporting said anodes, said bus bar forming a part of a conduit, the steps comprising, blowing under pressure an air curtain to envelop at least a portion of the vessel top, and directing said air curtain towards a source of suction formed within said conduit.

5. In an exhaust system, for use in connection with a vessel open on top, said vessel forming a cathode pot for an electrolytic furnace melt including at least one supporting bus bar structure for pre-burnt anodes, said bus bar structure extending above said top, the combination of
   a suction apparatus,
   and means for establishing an air duct around said open top having outlet means throughout its length operable to set up an upwardly directed inwardly inclined air curtain extending between said duct and said suction apparatus around exhaust gases arising from said vessel,
   said suction apparatus including an exhaust gas discharge conduit established substantially within said supporting bus bar structure.

6. In an exhaust system, as claimed in claim 5, said suction apparatus defining said exhaust gas discharge conduit.

References Cited

UNITED STATES PATENTS

| | | | |
|---|---|---|---|
| 2,061,146 | 11/1936 | Ferrand | 204—247 X |
| 2,564,837 | 8/1951 | Ferrand | 204—247 |
| 3,192,140 | 6/1965 | Zorzenoni | 204—247 X |
| 3,470,075 | 9/1969 | Johnson | 204—243 X |
| 3,386,365 | 6/1968 | Jensen | 263—50 X |
| 3,396,954 | 8/1968 | Krogsrud | 263—50 |
| 3,425,335 | 2/1969 | Black | 98—36 X |
| 3,566,811 | 3/1971 | Tidd | 98—36 X |

FOREIGN PATENTS

| | | | |
|---|---|---|---|
| 37/12901 | 9/1962 | Japan | 204—247 |
| 193,084 | 3/1967 | U.S.S.R. | 204—247 |

JOHN H. MACK, Primary Examiner

D. R. VALENTINE, Assistant Examiner

U.S. Cl. X.R.

98—36, 115; 263—50